Oct. 31, 1961  C. F. GREEN ET AL  3,007,050
THERMO-RESPONSIVE DETECTOR SYSTEM
Filed Nov. 29, 1939
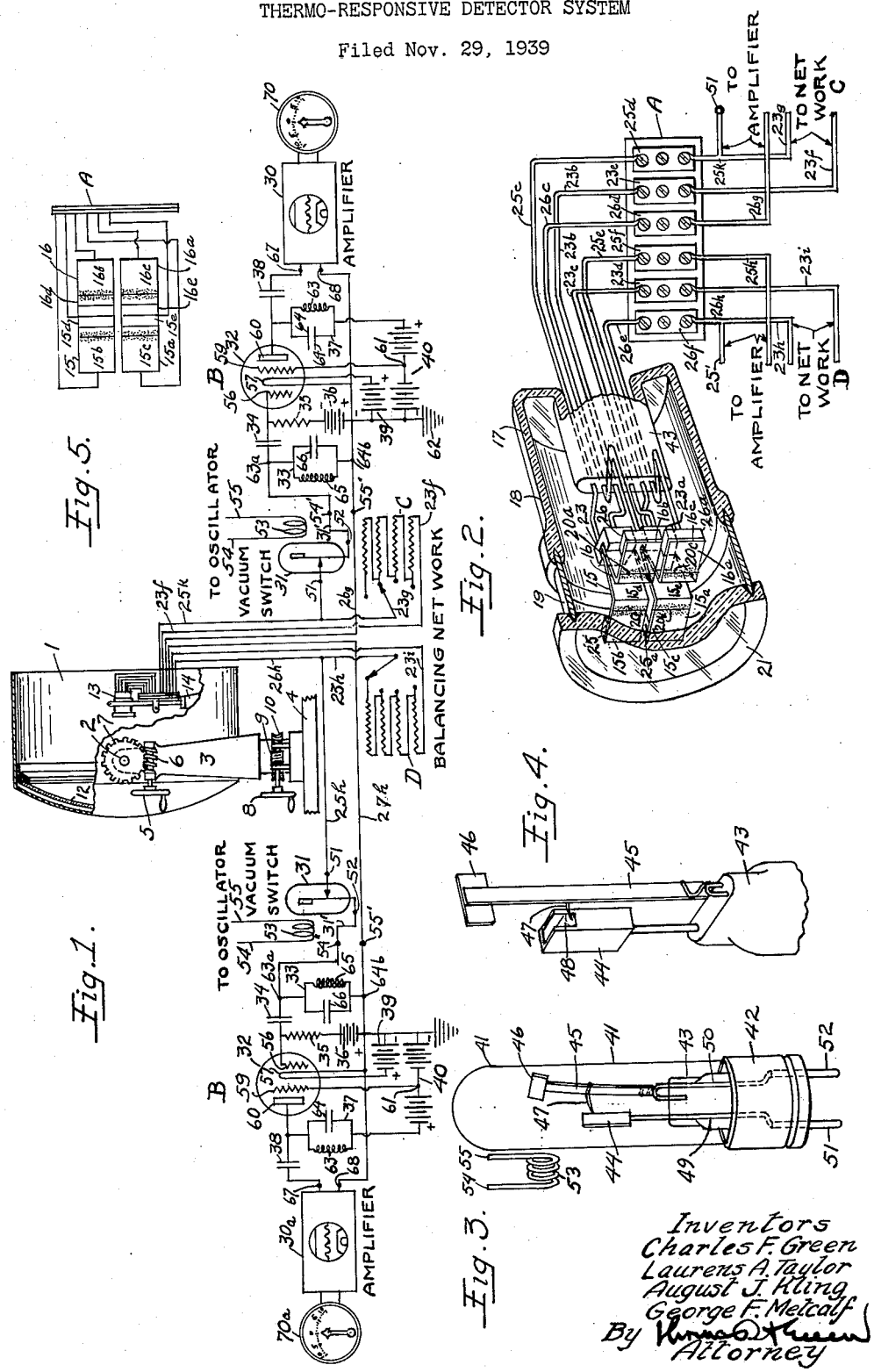
Inventors
Charles F. Green
Laurens A. Taylor
August J. Kling
George F. Metcalf
By
Attorney 3,007,050
THERMO-RESPONSIVE DETECTOR SYSTEM
Charles F. Green, Laurens A. Taylor, and August J. Kling, Schenectady, and George F. Metcalf, Glenville, N.Y., assignors, by mesne assignments, to the United States of America as represented by the Secretary of War
Filed Nov. 29, 1939, Ser. No. 306,756
11 Claims. (Cl. 250—83.3)

This invention relates to a thermo-responsive detector system; more especially it is directed to a system for affording long range detection of an airplane or the like by means of the thermal radiation received therefrom.

One object of this invention is to provide a thermo-responsive detector system, highly sensitive to thermo-radiation and having facilities for locating an airplane or other heat radiating body in rapid flight or motion when such airplane or body is still many miles from the site of the system.

Another object of this invention is to provide a thermo-responsive detector system, highly sensitive and rapid in response to a distantly located heat radiating body and which is adapted to be installed at a suitable observation post or station, whereby an airplane or the like in rapid flight may be quickly "spotted" and its course of flight tracked while said plane is still many miles from the observation post or station.

Another object of this invention is to provide a detector system of the character specified whereby the feeble voltage produced by a double "line" thermo-couple arranged in optical relation with a suitable collector system may be caused to effect operation of a standard milliammeter to indicate a distant heat radiating body and to permit its location in azimuth and elevation.

Another object of this invention is to provide a thermo-responsive detector system having a vacuum switch functioning to intermittently connect the output of a heat sensitive device with a low loss tuned inductance located in advance of a conventional tube amplifier whereby the output of the heat sensitive device will be amplified sufficiently to insure a dependable response to the electrical translation of the thermo-energy emanating from the distant body and focused on the heat sensitive device.

Another object of this invention is to provide a thermo-responsive detector system embodying a detecting device having compensated thermo-couples arranged one above the other, each couple being connected to a separate amplifier-indicator system, whereby two operators may be supplied with information concerning the location of the distant target.

With these and other objects in view this invention consists in certain novel details of construction, combination and arrangement of parts to be more fully hereinafter set forth and claimed.

Referring more particularly to the accompanying drawings in which corresponding parts are indicated by similar reference characters:

FIG. 1 is a diagrammatic view of the instant application and illustrating the detector apparatus and its associated amplifier-indicator systems;

FIG. 2 is a sectionized perspective view of the thermo-couple vacuum tube used in connection with the instant system and adapted to be positioned in the focal region of the reflector and illustrating the leads from the tube to the terminal block, and a fragment of each lead from the terminal block to the network and amplifiers respectively;

FIG. 3 is an elevation of a magnetically driven vacuum switch used to intermittently connect the output of the thermo-couple tube with the amplifier-indicator system;

FIG. 4 is an enlarged fragmentary detail of the make and break elements of the vacuum tube and illustrating in perspective the mercury cup, the vibrating strip and the contact prong extending from the strip and adapted to dip into the mercury within the cup, and FIG. 5 is a diagrammatic view partly in elevation and illustrating the "line" thermo-couples and their connections with the terminal block.

Many attempts have been made to provide long range airplane detection by means of the heat waves emanating therefrom but tests made with the most promising of these systems soon demonstrated that for ranges in excess of one or two miles, they were unsatisfactory due largely to the fact that there existed no thermo-responsive device sufficiently sensitive to pick up heat waves emanating from a rapidly moving thermo-radiator ten or twelve miles distant. To meet this situation a detector apparatus was developed which included high vacuum thermo-couple tubes of the type described and claimed in the copending applications of Charles F. Green, filed November 29, 1939, Serial No. 306,754, and Laurens A. Taylor, filed November 29, 1939, Serial No. 306,755.

As the output voltage of these tubes was less than $10^{-8}$ ordinary methods of amplification were found to be totally inadequate and it was necessary to develop a special means of amplification to precede the conventional vacuum tube amplifiers, said means including a suitably operated vacuum switch and low loss tuned inductance to afford a maximum rate of amplification to thermal agitation noises. When the preceding developments had been perfected there was provided the system constituting the subject matter of the instant invention which briefly stated comprises a reflector, a high vacuum thermo-couple tube mounted within the focal region of the reflector; said tube having therein two compensated thermo-couple units arranged one above the other, each unit being connected to a separate amplifier-indicator system, the respective amplifier-indicator systems being intermittently connected to the output of the thermo-couple tube by a magnetically driven vacuum switch.

In the illustrated embodiment characterizing this invention, a drum 1 is pivotally mounted at 2 between the arms of the yoke 3 which is swivelly supported on base 4. This arrangement permits vertical and horizontal oscillation of the drum, as clearly shown in FIG. 2 of the drawings. Suitable means are provided for moving the drum in each of the two planes, whereby changes in elevation and azimuth may be effected for spotting an apparatus. While such means may be manually or power operated, the former is illustrated for the sake of simplicity. Thus the hand wheel 5 operates through worm 6 and wormwheel 7 to move the drum in the vertical plane and the hand wheel 8 functioning through worm 9 and wormwheel 10 serves to move the drum in the horizontal plane.

Within the drum is mounted a reflector 12 in the focal region of which is arranged a double "line" thermo-couple vacuum tube 13, the tube being suitably supported on the upper end of a standard 14, as shown in FIG. 1 of the drawings. Thermo-couple tube 13 contains two "line" units arranged one above the other, each unit being composed of a pair of thermo-couple strips 15 and 16 and 15a and 16a respectively which are horizontally disposed and arranged in end to end relation with the junction lines 20—20a and 20b—20c extending vertically, as clearly shown in FIG. 2 of the drawings. These units are mounted in and near one end of an evacuated envelope 17 which comprises a glass portion 18 having a metallic end portion 19 which, in the present instance, is in the form of a silver sleeve. The end portion is attached at its free end to a window plate 21 having a high transmission coefficient for low temperature radiation such as rock salt. The sleeve has a thin tapered edge at both ends, the glass being fused over the inner end. The outer end of the sleeve is made vacuum tight with the rock salt window by a suitable seal such as silver chloride, as clearly described and claimed in the accompanying application of August J. Kling, filed November 29, 1939, Serial No. 306,750.

Each of the thermo-couple strips 15 and 16 and 15a—16a forming the two line units has been made by welding together at their edges thin plates of electrically dissimilar metals and then rolling down the welded plates until they have obtained the requisite thinness, which is of the order of six to ten millionths of an inch. Since the direction of the rolling is transversely of the strip, or in other words in the direction of its junction line, the welded connection between the two metals is preserved even though the thickness of the resulting strip is reduced to a few millionths of an inch. Very successful results have been obtained by employing for one element of the thermo-couple strips 15 and 16 an alloy composed of nickel 44%, copper 35.5% and iron 0.5%, commonly known as "Copnic," and for the other element of the thermo-couple strips 15 and 16 an alloy composed of nickel 90% and chromium 10%, commonly known as "Chromel."

The thermo-couple strips 15 and 16 and 15a—16a of the respective line units are horizontally arranged in end to end relation and are connected in series but in a reverse manner, that is to say, the two outer elements 15b—16b and 15c—16c of the respective line units (which are of one polarity) are connected to supporting bars 25—26 and 25a—26a respectively, and the inner or intermediate elements 15d—16d and 15e—16e of the respective line units (which are of the opposite polarity) are secured to the intermediate bars 23 and 23a respectively.

The lengths of the electrically dissimilar metals forming each of the thermo-couple strips, are substantially equal, the exact lengths being such that the rates of heat conduction of the supporting bars, considering the heat conducting properties of the materials, are equal. The intermediate bars 23—23a are approximately twice the size of the outer bars 25—26 and 25a—26a, whereby they have approximately twice the heat capacity thereof. Each of the vertically extending junction lines 20—20a and 20b—20c is arranged substantially in the middle of its thermo-couple strip, as clearly shown in FIG. 2 of the drawings.

In order to bring the junction lines 20—20a and 20b—20c of the respective line units closer together, the inner elements 15d—16d and 15e—16e are bent backward, as shown in FIG. 2 of the drawings. By thus bringing the two junction lines 20—20a and 20b—20c of the respective units closer together, one thermo-couple strip of each unit can be made to respond to a background region of radiation, which is closer to the body, whose radiation effects the adjoining strip of said unit, consequently in so far as background radiation is concerned the outpuet of the thermo-couple strips of the respective units will exactly balance one another.

Assuming that the super-imposed thermo-couple strips 15—15a are those to be used for detection of a radiating body, while the other junction strips 16—16a are those to be used for background compensation, then as shown in FIG. 2 of the drawings, the inner bars 23—23a are connected to the conductors 23b—23c, which extend through the stem of the glass envelope 17 to terminals 23e—23d of terminal block A. The outer bars 25—26 of the upper line unit are connected to conductors 25c—26c which extend through the tube of envelope 17 to terminals 25d—26d of terminal block A. The remaining bars 25a—26a of the lower line unit are connected to conductors 25e—26e which extend, as in the case of the other conductors, through the envelope 17 to terminals 25f—26f of terminal block A.

Conventional amplifiers are arranged in electrical relation with respect to the output of the two lines units in the thermo-couple tube, however, owing to the feeble voltage generated by these units (which is less than $10^{-8}$), ordinary methods of amplification were found to be totally inadequate and to meet this situation it was necessary to precede each of the conventional amplifiers 30 and 30a with a special form of amplification which hereinafter will be designated as the "initial amplification stage B."

Each initial amplification stage B comprises a thyratron driven vacuum switch 31, a conventional amplifying tube 32, an oscillatory circuit 33, a grid condenser 34, gridleak resistance 35, bias battery 36, filter circuit 37, grid condenser 38, "A" battery 39 and "B" battery 40 which will now be considered in the order of their enumeration.

Thyratron driven vacuum switch 31 consists of an evacuated envelope 41 mounted in a metallic base 42. Press 43 within the tube supports a metallic mercury cup 44, and vibratory reed 45, the latter having a natural period of vibration of approximately fifteen to twenty cycles per second. A crosshead 46 of magnetic material is attached to the free end of the reed and spaced from this crosshead is a laterally extending prong contact 47 which projects through a cutout portion of the mercury cup 44 so that as the reed vibrates the end of the prong will be caused to pass into and out of the mercury contact 48 within the cup, thus making and breaking the contacts of the switch. These contacts are connected through conductors 49 and 50 with the input and output terminals 51 and 52 of the vacuum switch, as clearly shown in FIG. 3 of the drawings.

Exterior of the tube at a point opposite the crosshead 46 of reed 45 is a coil 53 the terminals 54 and 55 of which are adapted to be connected with a low frequency oscillator (not shown), preferably in the form of a thyratron driver. With this arrangement and assuming the thyratron driver to be in oscillation the alternation of the magnetic field of coil 53 will impart a vibratory movement to reed 45 thus causing prong contact extending from said reed to enter and leave the mercury in cup 44 at the frequency of the thyratron driver, as will be understood without further discussion. In this connection it is to be noted, however, that the frequency of the thyratron driver must be such as to permit the contacts of the switch to remain closed for a time interval sufficient to permit the current flowing through the input inductance hereinafter to be referred to, to obtain its maximum value before said contacts are opened.

Amplifying tube 32 in each amplification stage B is of conventional type and includes control grid 56, filament 57, shield grid 59 and plate 60, control grid 56 being connected to the input circuit through grid condenser 34, filament 57 to the positive and negative sides of battery 39, shield grid 59 to the 45-volt tap 61 of battery 40, plate 60 to the 180-volt terminal of battery 40 through filter circuit 37 which includes inductance 63 and capacity 64. The negative side of battery 40 is connected to ground 62.

Arranged across the input circuit of amplification stage B, between points 63a and 64b is an oscillatory circuit 33 including low loss inductance coil 65 and condenser 66, hereinafter to be more fully referred to. Extending between control grid 56 and filament 57 is the usual gridleak resistance circuit including gridleak resistance 35 and biasing battery 36. The output of the plate circuit of amplifying tube 32 is transmitted through condenser 38 to terminals 67 and 68 to the input side of amplifiers 30 and 30a. The output sides of said amplifiers are connected to standard milliammeters 70 and 70a, as clearly shown in FIG. 2 of the drawings.

To enable the input inductance of the initial stage of amplification preceding amplifier 30, to be intermittently connected wtih the uppermost of the two thermo-couple line units within the thermo-couple tube, terminal plate 25d of terminal block A is connected to terminal 51 of vacuum switch 31 via conductor 25k and the remaining terminal 52 of said vacuum switch is connected via conductor 31' to terminal 54' of the input circuit of said initial stage of amplification. The remaining terminal 55' of said input circuit is connected via conductor 26g to terminal plate 26d of terminal block A. In like manner the input inductance 65 of the initial stage of amplification preceding amplifier 30a is connected with the lowermost of the line units within the thermo-couple tube through conductors 25h—25'—26h extending from terminal plates 25f—26f of terminal block A, as clearly shown in FIGS. 1 and 2 of the drawings.

With the components of the initial stage of amplification electrically related as previously stated and with the vacuum switches operating at the frequency of their oscillatory drivers when the contacts of vacuum switch 31 have been closed, the thermo-couple voltage causes a current to flow through the inductance 65. When this current has reached its maximum value the switch contacts 47 and 48 are opened, thus causing the magnetic energy stored in inductance 65 to be transferred to condenser 66. The oscillations set up in circuit 33 by the alternate charge and discharge of condenser 66 are impressed upon control grid 56 of amplifier tube 32 through grid condenser 34 to produce amplified variations in the plate circuit which are transmitted to terminals 67 and 68 through condenser 38 and from said terminal to the input side of amplifiers 30 and 30a, as will be understood without further discussion.

To correct for small differences in resistance in thermo-couple construction, which may occur in manufacture due to the variations in materials, thickness of the thermo-couple strip etc., a balancing network C is connected between terminal plates 23e and 25d of terminal block A via conductors 23f and 23g—25k, and a similar network D is connected between terminal plates 23d and 26f of terminal plate A via conductors 23h—26h—23i, as clearly shown in FIG. 2 of the drawings. The resistance elements of the respective networks when properly introduced will balance the output of the respective line units, as the beam of the detector is swung from horizon to zenith in a clear sky, thus stabilizing the pointers of the indicators, as will be understood without further discussion.

With the various elements of the instant system arranged and electrically connected as hereinabove stated, the operation of the system is as follows: Assuming that the drum 1 is swung in azimuth during the search for a distant radiating body, such as an airplane and that indicator 70 shows a deflection indicating that the image of such body has fallen on the thermo-couple strip 15 of the upper line unit and has reached junction line 20 of the strip. When this occurs the operator will know that the drum is directed on the meridian containing the radiating body and likewise that the image has fallen on the upper thermo-couple strip 15 rather than on the lower thermo-couple strip 15a. In order that the operator may determine the exact position of the body in elevation, as well as in azimuth, drum 1 is tilted by manipulation of hand wheel 5, to cause the image of the radiating body to move downwardly along junction line 20.

When the drum 1 has been changed in elevation sufficiently the image of the body will reach focal point 42 where it will begin to leave the upper line unit and enter the lower line unit. The deflection of the indicator 70 will thereby decrease while the deflection of the indicator 70a will increase. By careful manipulation of the elevating control wheel 5 and if the object is moved in azimuth by simultaneous manipulation of hand wheel 8 in a suitable manner, the image of the radiating body can be retained exactly on focal point 42 in which case both indicators 70 and 70a will show approximately equal deflection. The drum under these conditions is pointed directly at the radiating body whereupon position of the body in azimuth and elevation may be read from the scales (not shown) in which the drum 1 is provided. Obviously if the image of the body is first picked up by the lower line unit the elevation of the drum will be changed in the opposite manner until the image reaches the focal point 42 where it will be held as previously stated.

In conclusion, it will be apparent that this invention provides a detector system which will locate an unknown source of radiation with a minimum amount of reflector searching movement and owing to its great sensitivity and rapidity in response will enable an airplane or other rapidly heat radiating body to be actuated at distances heretofore unattainable.

Having described our invention, what we claim as new and wish to secure by Letters Patent is:

1. In a long range thermo-responsive detector system, means for collecting and focusing the thermal energy radiated by a thermal radiator, a thermo-couple vacuum tube located within the focal region of the collected energy and an amplifier-indicator system in electrical relation with the output of the thermo-couple tube, said amplifier-indicator system including means in connection with the output of said thermo-couple tube for periodically developing a transient induced voltage across the input of said amplifier-indicator system for producing amplified variations thereof in said system.

2. In a long range thermo-responsive detector system, means for collecting and focusing the thermal energy radiated by a distant thermal radiator, a highly evacuated thermo-couple vacuum tube located within the focal region of the collected energy, and an amplifier-indicator system in electrical relation with the output of the thermo-couple tube, said amplifier-indicator system including means in connection with the output of said thermo-couple tube for periodically developing a transient induced voltage across the input of said amplifier-indicator system for producing amplified variations thereof in said system, said transient voltage being induced by the intermittent action of a make and break device in the output of said thermo-couple tube.

3. In a long range thermo-responsive detector system, means for collecting and focusing the thermal energy radiated by a distant thermal radiator, a highly evacuated thermo-couple tube located in the region of the collected energy, said tube embodying a window having a high transmission coefficient for low temperature radiation, and an amplifier-indicator system in electrical relation with the output of the thermo-couple tube, said amplifier-indicator system including means in connection with the output of said thermo-couple tube for periodically developing a transient induced voltage across the input of said amplifier-indicator system for producing amplified variations thereof in said system, said transient voltage being induced by the intermittent action of an oscillator driven make and break device in the output of said thermo-couple tube.

4. In a long range thermo-responsive detector system, means for collecting and focusing the thermal energy radiated by a distant thermal radiator, a highly evacuated thermo-couple vacuum tube located in the focal region of the collected energy, said tube having a rock salt window for the admission of said energy, and an amplifier-indicator system in electrical relation with the output of the thermo-couple tube, said amplifier-indicator system including means in connection with the output of said thermo-couple tube for periodically developing a transient induced voltage across the input of said amplifier-indicator system for producing amplifications thereof in said system, said transient voltage being induced by the intermittent action of an oscillator driven make and break device in the output of the thermo-couple tube.

5. In a long range thermo-responsive detector system, means for collecting and focusing the energy radiated by a distant thermal radiator, a highly evacuated thermo-couple tube located within the focal region of the collected energy, said tube embodying a rock salt window, and an amplifier-indicator system in electrical relation with the output of the thermo-couple tube, said amplifier-indicator system including an input inductance across the output of said thermo-couple tube and means for intermittently making and breaking the output of said tube to develop periodically an induced voltage across said inductance for the production of amplified variations thereof in said system.

6. In a long range thermo-responsive detector system, means for collecting and focusing the thermal energy radiated by a thermal radiator, a highly evacuated thermo-couple vacuum tube located within the focal region of the collected energy, said tube having a rock salt window, and an amplifier-indicator system in electrical relation with the output of the thermo-couple tube, said amplifier-indicator system including an input inductance across the output of said tube, and an oscillator driven vacuum switch in the output of said tube for intermittently making and breaking said output to develop periodically an induced voltage across said input inductance for the production of amplified variations thereof in said system.

7. In a long range thermo-responsive detector system, means for collecting and focusing the thermal energy radiated by a distant thermal radiator to form a thermal image thereof, a highly evacuated thermo-couple tube located within the focal region of the collected energy, said tube having a rock salt window and containing a thermo-couple unit, said unit including a pair of thermo-couple strips arranged in end to end relation and connected in electrical opposition to effect automatic opposition to effect automatic compensation for background radiation, said strips providing a pair of vertically extending thermal junction lines, one of said thermal junction lines being positioned to receive the thermal image formed by said first-mentioned means, an amplifier-indicator system in electrical relation with the output of said unit, said amplifier-indicator system including means in connection with the output of said thermo-couple unit for periodically developing a transient induced voltage across the input of said amplifier-indicator system for producing amplified variations thereof in said system, said transient voltage being induced by the intermittent action of an oscillator driven make and break device in the output of said thermo-couple unit.

8. In a long range thermo-responsive detector system, means for collecting and focusing the thermal energy radiated by a distant thermal radiator to form a thermal image thereof, a highly evacuated thermo-couple tube located within the focal region of the collected energy, said tube having a rock salt window and containing a pair thermo-couple units, each unit including a pair of thermo-couple strips arranged in end to end relation and connected in electrical opposition to effect automatic compensation for background radiation, said thermo-couple strips providing a pair of vertically extending laterally spaced thermal junction lines, one of said lines being positioned to receive the thermal image formed by said first-mentioned means, an amplifier-indicator system connected with the output of each of said line thermo-couple units, each of said amplifier-indicator systems including an input inductance arranged across the output of each of said units synchronously operated means for intermittently making and breaking the outputs of said units to develop periodically and simultaneously induced voltages across said input inductances for the production of amplified variations thereof in said systems.

9. In a long range thermo-responsive detector system, means for collecting and focusing the thermal energy radiated by a distant thermal radiator to form a thermal image thereof, a highly evacuated thermo-couple tube located within the focal region of the collected energy, said tube having a rock salt window and containing a pair of thermo-couple line units each of said units including a pair of thermo-couple strips arranged in end to end relation and connected in electrical opposition to effect automatic compensation for background radiation, said thermo-couple strips providing a pair of vertically extending juxtapositioned thermal junction lines, one of said lines being disposed to receive the thermal image formed by said first-mentioned means, and an amplifier-indicator system in electrical relation with the output of each of said units, each amplifier-indicator system including an induction coil arranged across the output of its associated thermo-couple unit and an oscillator driven vacuum switch operating intermittently to make and break the output of said unit for periodically developing an induced voltage across said input inductance for the production of amplified variations thereof in said system.

10. In a long range thermo-responsive detector system, means for collecting and focusing the thermal energy radiated by a distant thermal radiator to form a thermal image thereof, a highly evacuated thermo-couple tube located within the focal region of the collected energy, said tube having a rock salt window and containing a pair of compensated thermo-couple line units arranged one above the other, each of said units including a pair of thermo-couple strips arranged in end to end relation and connected in electrical opposition to effect automatic compensation for background radiation, said thermo-couple strips being provided with juxtapositioned vertically extending thermal junction lines, the junction line of one of said units being in alinement with those of the other of said units, and the opposing extremities of one pair of alined junction lines being disposed to receive the thermal image formed by said first-mentioned means and an amplifier-indicator system in electrical relation with the output of each of said units, each of said amplifier-indicator systems including an input induction arranged across the output of its associated unit and an oscillator-driven vaccum switch for intermittently making and breaking the output of said unit to develop periodically an induced voltage across said input inductance for the production of amplified variations thereof in said system.

11. In a long-range thermal responsive detector system, a reflector system for collecting and focusing heat radiation from a distant body, means within the focal region of the reflector system for translating thermal into electrical energy, said means including means for detecting the position of the heat radiating body in azimuth and in elevation and comprising an evacuated vessel provided with a rock-salt window, a pair of thermo-electric generating units situated one above the other within the vessel, each unit being composed of a pair of thermo-couple strips arranged in end to end relation and interconnected at their extremities in bucking relation, each strip having a junction line coextensive with its width, the junction lines of one unit being in alined relation with respect to those of the underlying unit, one pair of junction lines being disposd so that the focal point of the reflector system will be located between the units and at the meeting ends of said alined junction lines, an amplifier-indicator system in electrical relation with the output of each of said thermo-electric generating units, each amplifier-indicator system including means for periodically developing a transient induced voltage across the input of its associated amplifier-indicator system for producing amplified variations thereof in said system.

References Cited in the file of this patent

UNITED STATES PATENTS

| | | |
|---|---|---|
| 1,343,393 | Hoffman | June 15, 1920 |
| 1,390,883 | Case | Sept. 13, 1921 |
| 1,667,595 | Halle | Apr. 24, 1928 |
| 1,963,185 | Wilson | June 19, 1934 |
| 2,124,600 | Worrall | July 26, 1938 |
| 2,144,519 | Wilson | Jan. 17, 1939 |